United States Patent
Khalifeh et al.

(10) Patent No.: US 10,232,856 B2
(45) Date of Patent: Mar. 19, 2019

(54) VEHICLE USER-COMMUNICATION SYSTEM AND METHOD

(71) Applicant: Ford Global Technologies, LLC, Dearborn, MI (US)

(72) Inventors: Ahmad Khalifeh, Dearborn, MI (US); Levasseur Tellis, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 174 days.

(21) Appl. No.: 15/221,818

(22) Filed: Jul. 28, 2016

(65) Prior Publication Data

US 2018/0029607 A1    Feb. 1, 2018

(51) Int. Cl.
```
B60W 50/00    (2006.01)
B60W 50/08    (2012.01)
B60W 10/04    (2006.01)
B60W 10/18    (2012.01)
B60W 10/20    (2006.01)
G01C 21/20    (2006.01)
G05B 19/042   (2006.01)
H04L 29/08    (2006.01)
H04W 4/80     (2018.01)
G01C 21/36    (2006.01)
G05D 1/02     (2006.01)
```

(52) U.S. Cl.
CPC .......... *B60W 50/082* (2013.01); *B60W 10/04* (2013.01); *B60W 10/18* (2013.01); *B60W 10/20* (2013.01); *G01C 21/20* (2013.01); *G01C 21/3697* (2013.01); *G05B 19/042* (2013.01); *H04L 67/12* (2013.01); *H04W 4/80* (2018.02); *B60W 2540/00* (2013.01); *B60W 2550/402* (2013.01); *G05B 2219/2637* (2013.01); *G05D 1/0278* (2013.01); *G05D 2201/0213* (2013.01)

(58) Field of Classification Search
CPC .... B60W 50/082; B60W 10/18; B60W 10/20; B60W 10/04; B60W 2540/00; B60W 2550/402; B60W 30/00; B60W 30/16; B60W 2050/0077; B60W 2050/146; B60W 2540/04; B60W 2550/143; B60W 2550/146; B60W 2550/308; B60W 40/09; B60W 50/14; H04W 4/80; G01C 21/20; G01C 21/367; G01C 21/3691; G01C 21/36; G01C 21/3641; G01C 21/3655; G05B 19/042; G05B 19/2637; G05D 1/0278; G05D 2201/0213; H04L 67/12; G08G 1/0968; G08G 1/166; G06F 3/048
See application file for complete search history.

(56) References Cited

U.S. PATENT DOCUMENTS 8,509,982 B2    8/2013 Montemerlo et al.
8,626,439 B2 *  1/2014 Zhou .................. G01C 21/3492
                                                  701/423

(Continued)

*Primary Examiner* — Jason Holloway
(74) *Attorney, Agent, or Firm* — Frank A. MacKenzie; Bejin Bieneman PLC

(57) ABSTRACT

A controller includes a processor and a memory storing processor-executable instructions. The processor is programmed to control steering and at least one of propulsion and braking of a vehicle while following a route segment and, during the route segment, to activate a user interface at a frequency based on at least one of an elapsed duration of the route segment, an age of a user, a time of day, and a route-segment topology.

20 Claims, 2 Drawing Sheets

(56) References Cited

U.S. PATENT DOCUMENTS

| | | | |
|---|---|---|---|
| 8,818,608 B2 | 8/2014 | Cullinane et al. | |
| 8,874,301 B1 | 10/2014 | Rao et al. | |
| 9,098,080 B2 | 8/2015 | Norris et al. | |
| 9,141,107 B2 | 9/2015 | Ferguson et al. | |
| 2003/0191585 A1* | 10/2003 | Sakamoto | G01C 21/36 701/423 |
| 2005/0278113 A1* | 12/2005 | Maruyama | G01C 21/36 701/436 |
| 2007/0208498 A1* | 9/2007 | Barker | G08G 1/0104 701/117 |
| 2011/0035141 A1* | 2/2011 | Barker | G08G 1/0104 701/119 |
| 2012/0010807 A1* | 1/2012 | Zhou | G01C 21/3492 701/423 |
| 2015/0127189 A1* | 5/2015 | Mehr | B60W 30/165 701/1 |
| 2015/0241878 A1 | 8/2015 | Crombez et al. | |

\* cited by examiner

VEHICLE USER-COMMUNICATION SYSTEM AND METHOD

BACKGROUND

Various entities define levels of autonomy that classify vehicles according to how autonomously the vehicles can operate. The National Highway Traffic Safety Administration (NHTSA) establishes five levels (0 to 4) and defines Level 2 as "automation of at least two primary control functions designed to work in unison to relieve the driver of control of those functions," for example, "adaptive cruise control in combination with lane centering." The Society of Automotive Engineers establishes six levels (0 to 5) and defines Level 2 autonomy as "the driving mode-specific execution by one or more driver assistance systems of both steering and acceleration/deceleration using information about the driving environment and with the expectation that the human driver perform all remaining aspects of the dynamic driving task."

During Level 2 autonomous driving under either definition, a driver of a vehicle is expected to maintain attention on the task of driving the vehicle while the vehicle performs many of the actions of the driving task. This is a problem unique to semi-autonomous vehicles. If the vehicle has full autonomy, then the driver is not expected to maintain attention on the driving task. If the vehicle is nonautonomous, then the driver is constantly performing actions to control the vehicle, which thus maintains the attention of the driver.

DETAILED DESCRIPTION

Figure 1:
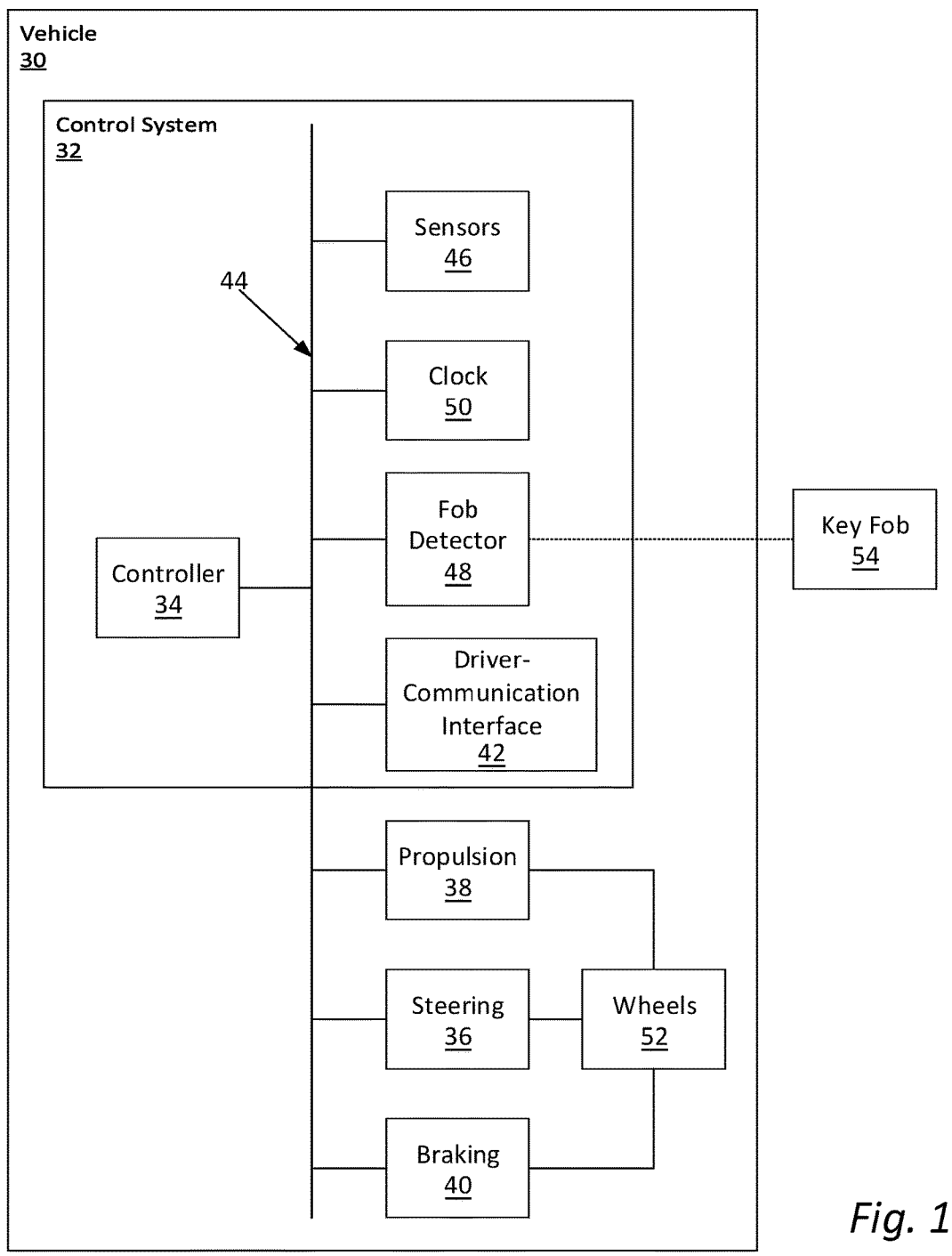
FIG. 1 is a block diagram of elements of a vehicle.

With reference to the Figures, a controller 34 includes a processor and a memory storing processor-executable instructions. The processor is programmed to control steering 36 and at least one of propulsion 38 and braking 40 of a vehicle 30 while following a route segment and, during (i.e., while following) the route segment, to activate a user interface 42 at a frequency based on at least one of an elapsed duration of the route segment, an age of a user, a time of day, and a route-segment topology.

The controller 34 as disclosed herein addresses a problem arising in control of semi-autonomous vehicles, and provides a solution that allows for enhanced control of semi-autonomous vehicles. For example, the presently disclosed subject matter provides for maintaining the attention of the user on the driving task in a semi-autonomous vehicle.

The vehicle 30 may be an autonomous or semi-autonomous vehicle. The controller 34, sometimes referred to as the "virtual driver," may be capable of operating the vehicle 30 independently of the intervention of the user, who is a human capable of driving the vehicle 30, to a greater or a lesser degree. The controller 34 may be programmed to operate the steering 36, propulsion 38, braking 40, and/or other vehicle systems. Specifically, the vehicle 30 may be capable of Level 2 autonomous driving, or higher, as defined by NHTSA or by SAE. For example, the controller 34 may control the steering 36 and at least one of the propulsion 38 and the braking 40 of the vehicle 30 while following a route.

The controller 34 is included in a control system 32 for carrying out various operations, including as described herein. The controller 34 is a computing device that generally includes the processor and the memory, the memory including one or more forms of computer-readable media, and storing instructions executable by the processor for performing various operations, including as disclosed herein. The memory of the controller 34 further generally stores remote data received via various communications mechanisms; e.g., the controller 34 is generally configured for communications on a controller area network (CAN) bus or the like, and/or for using other wired or wireless protocols, e.g., Bluetooth, etc. The controller 34 may also have a connection to an onboard diagnostics connector (OBD-II). Via a communications network 44 using Ethernet, WiFi, the CAN bus, Local Interconnect Network (LIN), and/or other wired or wireless mechanisms, the controller 34 may transmit messages to various devices in the vehicle 30 and/or receive messages from the various devices, e.g., controllers, actuators, sensors 46, etc., e.g., controllers and sensors 46 as discussed herein. For example, the controller 34 may receive data from sensors 46. Although one controller 34 is shown in FIG. 1 for ease of illustration, it is to be understood that the controller 34 could include, and various operations described herein could be carried out by, one or more computing devices.

The control system 32 includes the controller 34, the sensors 46, a fob detector 48, a clock 50, and the user interface 42, all communicating through the communications network 44.

The control system 32 may transmit signals through the communications network 44 such as a controller area network (CAN) bus, Ethernet, Local Interconnect Network (LIN), and/or by any other wired or wireless communications network.

The vehicle 30 may include the sensors 46. The sensors 46 may detect internal states of the vehicle 30, for example, wheel speed, wheel orientation, and engine and transmission variables. The sensors 46 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world, for example, radar sensors, scanning laser range finders, light detection and ranging (LIDAR) devices, image processing sensors such as cameras. The sensors 46 may include communications devices, for example, vehicle-to-infrastructure (V2I) or vehicle-to-vehicle (V2V) devices.

The propulsion 38 of the vehicle 30 generates energy and translates the energy into motion of the vehicle 30. The propulsion 38 may be a known vehicle propulsion subsystem, for example, a conventional powertrain including an internal-combustion engine coupled to a transmission that transfers rotational motion to wheels 52; an electric powertrain including batteries, an electric motor, and a transmission that transfers rotational motion to the wheels 52; a hybrid powertrain including elements of the conventional powertrain and the electric powertrain; or any other type of propulsion. The propulsion 38 is in communication with and receives input from the controller 34 and from a human driver. The human driver may control the propulsion 38 via, e.g., an accelerator pedal and/or a gear-shift lever.

The steering 36 is typically a known vehicle steering subsystem and controls the turning of the wheels 52. The steering 36 is in communication with and receives input from a steering wheel and the controller 34. The steering 36 may be a rack-and-pinion system with electric power-assisted steering, a steer-by-wire system, as are both known, or any other suitable system.

The braking 40 is typically a known vehicle braking subsystem and resists the motion of the vehicle 30 to thereby slow and/or stop the vehicle 30. The braking 40 may be friction brakes such as disc brakes, drum brakes, band brakes, and so on; regenerative brakes; any other suitable type of brakes; or a combination. The braking 40 is in communication with and receives input from the controller 34 and a human driver. The human driver may control the braking 40 via, e.g., a brake pedal.

A key fob 54 may be associated with the vehicle 30. The key fob 54 may transmit a signal detectable within, e.g., a known radius, which may be a short distance. The transmitted signal may be, for example, infrared or radio. Multiple key fobs 54 may be associated with one vehicle 30, and the key fobs 54 may transmit different signals, allowing the vehicle 30 to differentiate the key fobs 54.

The fob detector 48 may be in communication with the controller 34. The fob detector 48 may be, e.g., a radio receiver able to receive the signal transmitted by the key fob 54 when the key fob 54 is within, e.g., the known radius of the fob detector 48.

The clock 50 may be in communication with the controller 34. Alternatively, the clock 50 may be embedded within the controller 34. The clock 50 may include, for example, a clock generator producing an oscillating signal with a fixed, constant frequency. The clock 50 may track a time of day. The controller 34 may use the clock 50 as a timer in order to track an elapsed duration since a particular event.

The user interface 42 presents information to and receives information from an occupant of the vehicle 30. The user interface 42 may be located, e.g., on an instrument panel in a passenger cabin of the vehicle 30, or wherever may be readily seen by the occupant. The user interface 42 may include dials, digital readouts, screens, speakers, and so on for providing information to the occupant, e.g., human-machine interface (HMI) elements such as are known. The user interface 42 may include buttons, knobs, keypads, a microphone, and so on for receiving information from the occupant.

Figure 2:
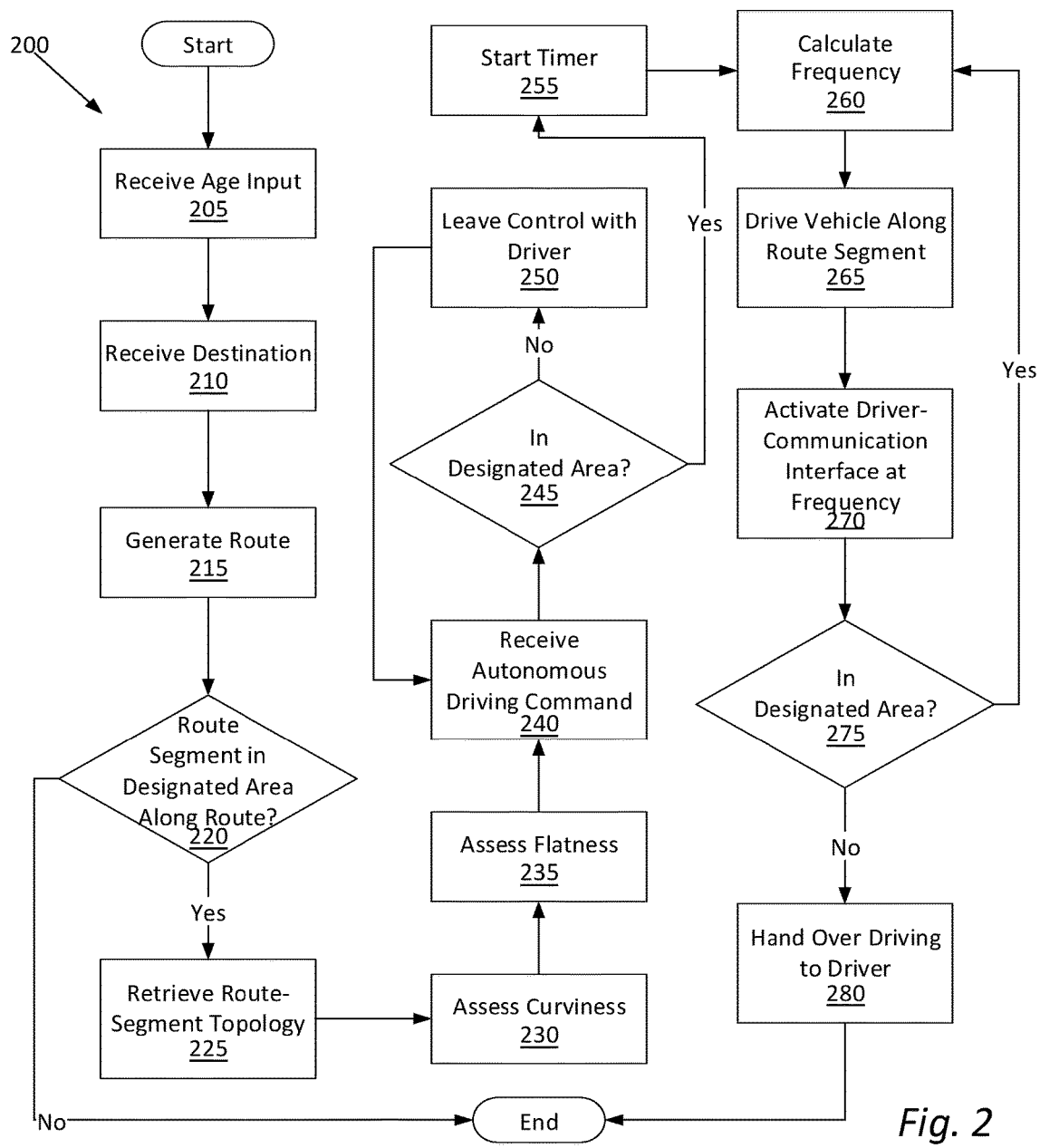
FIG. 2 is a process flow diagram of a process for communicating to a user of the vehicle.

FIG. 2 is a process flow diagram illustrating an exemplary process 200 for communicating to a user of the vehicle 30. The process 200 begins in a block 205, in which the controller 34 receives input indicating the age of the user. The user is someone who can manually drive the vehicle 30. For example, the controller 34 may store in the memory a user age associated with the signal of one of the key fobs 54, thus associating the key fob 54 with a user having a known age. The controller 34 may then receive input indicating the age of the user by detecting a proximity of the key fob 54, that is, detecting that the key fob 54 is within, e.g., the known radius of the fob detector 48. Alternatively, the user may input an age through the user interface 42 of the vehicle 30.

Next, in a block 210, the controller 34 receives a destination. For example, the user may input a destination into the user interface 42. As another example, the controller 34 may store a schedule including destinations to which to travel at stored times.

Next, in a block 215, the controller 34 receives a route to the destination. For example, the controller 34 may generate the route from a current location of the vehicle 30 to the destination using known route-planning techniques. The controller 34 may use information about the types of road, the number and types of intersections, traffic information, autonomous designation of the roads, and so on when generating the route. The autonomous designation of an area means the level of autonomy that vehicles on the roads in that area are permitted to use.

Next, in a decision block 220, the controller 34 determines whether a route segment within the route is designated for vehicles to control steering 36 and at least one of propulsion 38 and braking 40 while following the route segment, in other words, whether the autonomous designation of the area including the route segment indicates that semi-autonomous driving or Level 2 autonomous driving is permitted on the route segment. If the route includes no such route segment, the process 200 ends.

If the route segment is designated for vehicles to control steering 36 and at least one of propulsion 38 and braking 40 while following the route segment, next, in a block 225, the controller 34 retrieves the route-segment topology. The route-segment topology is the shape of the roads along the route segment. The route-segment topology may include, e.g., curviness of the roads, turns at intersections along the route segment, and changes in elevation along the route segment.

Next, in a block 230, the controller 34 assesses a curviness of the route-segment topology. The curviness is a score of how much vehicles turn while following the route segment, e.g., a score based on an aggregate change of steering angle over distance traveled. The curviness of the route segment may further depend on, for example, an average radius of curvature along the route segment, changes in the radius of curvature along the route segment, the number and frequency of turns at intersections on the route segment, etc. The curviness may be a single value for the route segment or may be assessed at numerous points along the route segment. An example of computing a curviness score of a point on the route segment is an inverse of an average radius of curvature, with the average radius of curvature sampled every 100 feet from 5000 feet behind to 5000 feet in front of the point on the route segment.

Next, in a block 235, the controller 34 assesses a flatness of the route-segment topology. The flatness is a score of how much the elevation of vehicles change while following the route segment, e.g., a score based on an aggregate change in grade over the distance traveled. The flatness of the route segment may depend on, for example, the elevation along the route segment, the gradient along the route segment, etc. The flatness may be a single value for the route segment or may be assessed at numerous points along the route segment. An example of computing a flatness score of a point on the route segment is a variance of the elevation sampled every 100 feet from 5000 feet behind to 5000 feet in front of the point on the route segment.

Next, in a block 240, the controller 34 receives a command to begin autonomous or semi-autonomous driving, that is, to control steering 36 and at least one of propulsion 38 and braking 40. For example, the user may input the command into the user interface 42.

Next, in a decision block 245, the controller 34 determines whether the vehicle 30 is in the area designated for autonomous or semi-autonomous driving, that is, for vehicles to control steering 36 and at least one of propulsion 38 and braking 40. In other words, the controller 34 determines whether the vehicle 30 is on the route segment identified in the decision block 220.

If the vehicle 30 is not in an area designated for autonomous or semi-autonomous driving, next, in a block 250, the controller 34 leaves control of the vehicle 30 with the user.

The controller 34 may notify the user that the vehicle 30 is not taking control, e.g., via the user interface 42.

If the vehicle 30 is in an area designated for autonomous or semi-autonomous driving, after the decision block 245, in a block 255, the controller 34 starts a timer. The timer thus measures an elapsed duration since the vehicle 30 began autonomous or semi-autonomous driving.

Next, in a block 260, the controller 34 calculates a frequency for activating the user interface 42 based on at least one of the elapsed duration of the route segment, the age of the user, the time of day, and the route-segment topology. The process 200 may pass through the block 260 multiple times during the route segment, and the frequency calculated by the controller 34 may change each time as the elapsed duration, the time of day, and the route-segment topology change.

If the frequency is based on the elapsed duration of the route segment, then the frequency may have a positive relationship with the elapsed duration. In other words, the frequency may become more frequent as the elapsed duration increases.

If the frequency is based on the age of the user, then the frequency may have a relationship with the age of the user. For example, the frequency may decrease with increasing age. For another example, the frequency may decrease with increasing age up to a particular age and then increase with increasing age.

If the frequency is based on the time of day, then the frequency may have a functional relationship with the time of day. For example, the frequency may be more frequent during nighttime than during daytime. For another example, the frequency may have a maximum value at, e.g., 3:00 AM, decrease from 3:00 AM to a minimum value at, e.g., 3:00 PM, and increase from 3:00 PM to 3:00 AM.

If the frequency is based on the route-segment topology, then the frequency may have a relationship with curviness, flatness, and/or other features of the route-segment topology. For example, the frequency may become less frequent as the curviness increases. For another example, the frequency may become more frequent as the flatness increases.

The frequency may be based on the elapsed duration of the route segment, the age of the user, the time of day, and the route-segment topology. If the frequency is based on multiple or all of the elapsed duration, the age of the user, the time of day, and the route-segment topology, then the frequency may give more weight to some of those factors than others. For example, the frequency may weight the elapsed duration more heavily than the age of the user, the age of the user more heavily than the time of day, and the time of day more heavily than the route-segment topology.

Next, in a block 265, the vehicle 30 begins or continues autonomous or semi-autonomous driving. In other words, the controller 34 controls steering 36 and at least one of propulsion 38 and braking 40 of the vehicle 30 while following the route segment.

Next, in a block 270, during the route segment, the controller 34 activates the user interface 42 at the frequency. The user interface 42 provides an alert to the user at an interval after autonomous or semi-autonomous driving began or after the previous alert. The interval is determined by the frequency. The alert from the user interface 42 may be visual, such as a message displayed on a screen or a blinking light; aural, such as a chime, beep, or prerecorded message from a speaker; haptic, such as a vibration of a seat in which the user is sitting; or a combination. The alert serves to refocus the user's attention on the driving of the vehicle 30. The alert may prompt an action from the user, such as placing the hands of the user on a steering wheel, or may not.

Next, in a decision block 275, the controller 34 determines whether the vehicle 30 is in the area designated for autonomous or semi-autonomous driving, as described above with respect to the decision block 245. If the vehicle 30 is in the designated area, the process 200 proceeds back to the block 260. During the route segment, the controller 34 may return to the block 260 to recalculate the frequency after each alert or at more or less frequent periodic intervals.

If the vehicle 30 is no longer in the designated area, next, in a block 280, the controller 34 hands over full operation of the vehicle 30 to the user. The controller 34 may provide a notification of the handover through the user interface 42, such as by displaying a message on a screen or playing a message through a speaker. The controller 34 may cease autonomous or semi-autonomous control upon receiving an indication that the user has resumed controlling the vehicle 30 by, for example, putting the hands of the user on the steering wheel, or by other known handover methods.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory storing processor-executable instructions, wherein the processor is programmed to:
   receive a command to control steering and at least one of propulsion and braking of a vehicle;
   control the steering and at least one of the propulsion and the braking while following a route segment;
   calculate a frequency based on at least one of an elapsed duration, a time of day, and a route-segment topology stored in the memory, wherein the elapsed duration is a time interval beginning when the processor began controlling received the command to control the steering and at least one of the propulsion and the braking; and
   during the route segment, repeat instruct a user interface to repeatedly generate an output at the calculated frequency.

2. The controller of claim 1, wherein calculating the frequency is based on the elapsed duration, an age of the user, the time of day, and the route-segment topology.

3. The controller of claim 2, wherein calculating the frequency weights the elapsed duration more heavily than the age of the user, the age of the user more heavily than the time of day, and the time of day more heavily than the route-segment topology.

4. The controller of claim 2, wherein the processor is further programmed to assess a curviness of the route-segment topology, and the calculated frequency becomes less frequent as the curviness increases.

5. The controller of claim 2, wherein the processor is further programmed to assess a flatness of the route-segment topology, and the calculated frequency becomes more frequent as the flatness increases.

6. The controller of claim 2, wherein the calculated frequency becomes more frequent as the elapsed duration increases.

7. The controller of claim 2, wherein the processor is further programmed to receive input indicating the age of the user.

8. The controller of claim 2, wherein the processor is further programmed to associate a key fob with a user having a known age, and detect a proximity of the key fob.

9. The controller of claim 1, wherein the processor is further programmed to receive a route including the route segment, and determine that the route segment is designated for vehicles to control steering and at least one of propulsion and braking while following the route segment.

10. The controller of claim 9, wherein the processor is further programmed to receive a destination, and to generate the route from the current location to the destination.

11. A method of driving a vehicle comprising:
receiving, by a controller of a vehicle, a command to control steering and at least one of propulsion and braking of the vehicle;
controlling, by the controller, the steering and at least one of the propulsion and the braking while following a route segment;
calculating, by the controller, a frequency based on at least one of an elapsed duration, a time of day, and a route-segment topology stored in the memory, wherein the elapsed duration is a time interval beginning when the controller received the command to control the steering and at least one of the propulsion and the braking; and
during the route segment, instructing, by the controller, a user interface to repeatedly generate an output at the calculated frequency.

12. The method of claim 11, wherein calculating the frequency is based on the elapsed duration, an age of the user, the time of day, and the route-segment topology.

13. The method of claim 12, wherein the calculating frequency weights the elapsed duration more heavily than the age of the user, the age of the user more heavily than the time of day, and the time of day more heavily than the route-segment topology.

14. The method of claim 12, further comprising assessing, by the controller, a curviness of the route-segment topology, wherein the calculated frequency becomes less frequent as the curviness increases.

15. The method of claim 12, further comprising assessing, by the controller, a flatness of the route-segment topology, wherein the calculated frequency becomes more frequent as the flatness increases.

16. The method of claim 12, wherein the calculated frequency becomes more frequent as the elapsed duration increases.

17. The method of claim 12, further comprising receiving, by the controller, input indicating the age of the user.

18. The method of claim 12, further comprising, by the controller, associating a key fob with a user having a known age, and detecting a proximity of the key fob.

19. The method of claim 11, further comprising, by the controller, receiving a route including the route segment, and determining that the route segment is designated for vehicles to control steering and at least one of propulsion and braking while following the route segment.

20. The method of claim 19, further comprising, by the controller, receiving a destination, and generating the route from the current location to the destination.

* * * * *

UNITED STATES PATENT AND TRADEMARK OFFICE
CERTIFICATE OF CORRECTION

PATENT NO. : 10,232,856 B2
APPLICATION NO. : 15/221818
DATED : March 19, 2019
INVENTOR(S) : Ahmad Khalifeh et al.

Page 1 of 1

It is certified that error appears in the above-identified patent and that said Letters Patent is hereby corrected as shown below:

In the Claims

Column 6, in Lines 42-43, replace "a time interval beginning when the processor began controlling received the command" with -- a time interval beginning when the processor received the command --.

Column 6, Line 46, replace "during the route segment, repeat instruct a user interface" with -- during the route segment, instruct a user interface --.

Signed and Sealed this
Seventeenth Day of December, 2019

Andrei Iancu
*Director of the United States Patent and Trademark Office*